United States Patent Office 3,454,762
Patented July 8, 1969

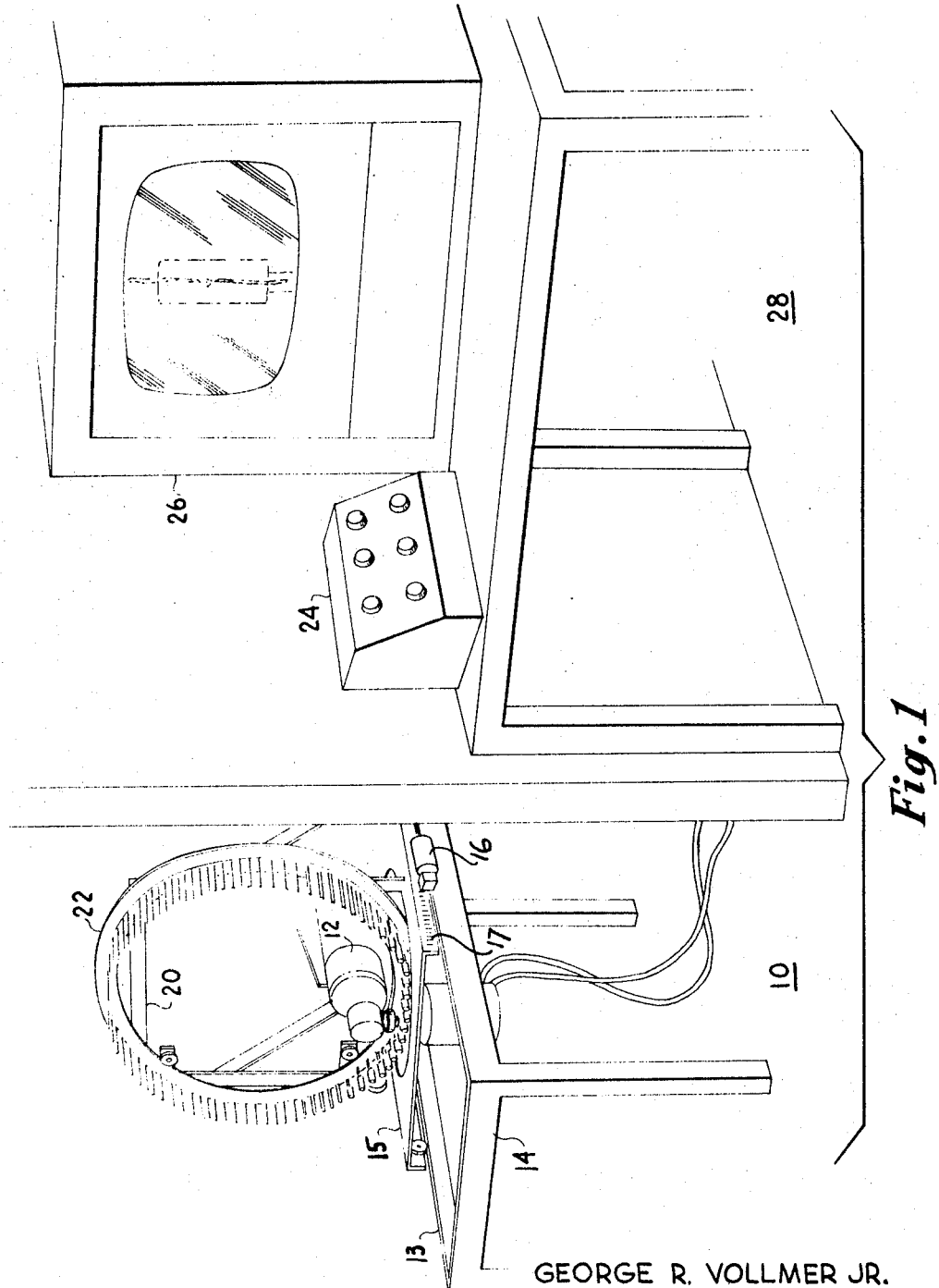

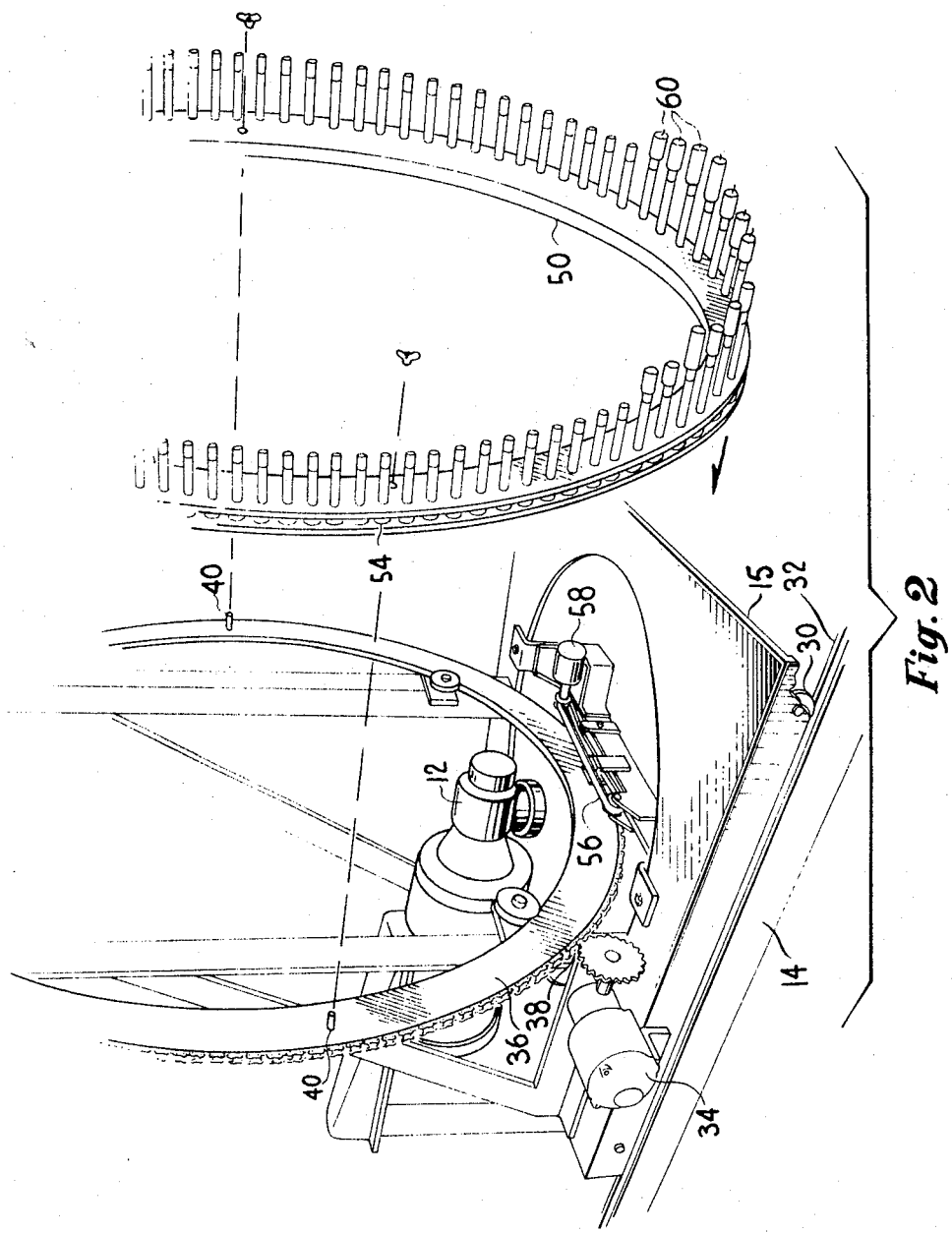

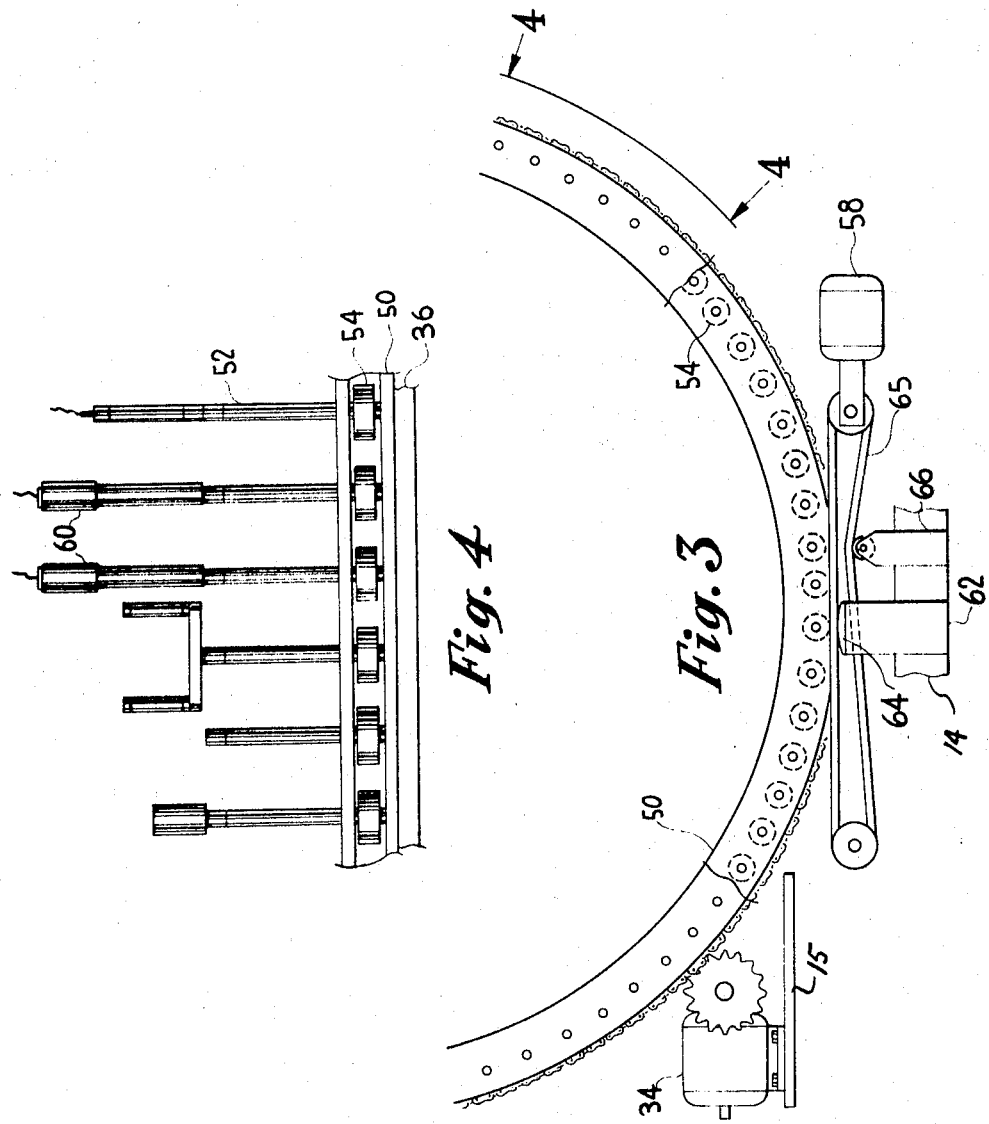

1

3,454,762
X-RAY INSPECTION DEVICE WITH SPECIMEN CARRYING MEANS ROTATIONALLY MOUNTED ON VERTICALLY DISPOSED CARRIAGE WHEEL
George R. Vollmer, Jr., San Diego, Calif., assignor to General Dynamics Corporation, San Diego, Calif., a corporation of Delaware
Filed Feb. 1, 1966, Ser. No. 524,063
Int. Cl. H01j 37/20
U.S. Cl. 250—52                                3 Claims

ABSTRACT OF THE DISCLOSURE

An X-ray inspection device having a multiplicity of specimen carrying and holding members rotationally mounted on a vertically disposed carriage wheel. The carriage wheel is rotationally supported on a frame fixed to a horizontally movable table. Remotely controlled X-ray equipment views the specimens through an opening in the table and transmits an enlarged picture onto a video screen located outside of the X-ray room. Specimens are individually rotated by console command and rotation of the carriage wheel is by console command.

---

This invention relates to a carriage device handling a multitude of parts for individual 360° inspection and more particularly relates to a device to inspect large quantities of electronic and mechanical parts in combination with an X-ray video-com television system.

It is an object of the present invention to provide a device for the handling of a mass quantity of parts to be individually inspected and whereby the parts are being moved 360° under an inspection means by remote control.

It is another object of the present invention to provide a device which is particularly designed to be used in combination with X-ray video-com TV systems.

It is still another object of the present invention to present a device which is capable of checking and inspecting a large quantity of parts in a minimum of time accurately and most reliably.

Furthermore, this invention provides other objects, features and advantages which will become fully apparent from the following detailed description taken in conjunction with the accompanying drawings which illustrate and clarify the preferred embodiment and in which:

FIGURE 1 illustrates a radiographic and microscopic inspection device having X-ray in combination with a closed TV system, which is located in a radiation and control-room.

FIGURE 2 shows in isometric fashion the important features of the device; a carriage or conveyor means mounted on the supporting structure and its individual drive means uniquely arranged and mounted to the supporting structure.

FIGURE 3 is a detailed view of drive means and part of the conveyor parts carrying ring.

FIGURE 4 is a sectional view taken along the indicated line 4—4 of FIGURE 3 and shows in particular a variety of several parts attached to the support holding means.

In general the invention comprises a device for carrying a multitude of parts whereby it is feasible to inspect each individual part 360° from a remote control point, in combination with X-ray video-com systems and optical closed circuit television systems. A conveyor means is carried by a support structure and engaged with a drive means or motor. The conveyor means is provided with a plurality of support holding means rotationally mounted thereon. A second drive means or motor is mounted to the support means and connected indirectly to the support holding means thereby capable of rotating the support holding means for 360°. The first and second drive means or motors are energized via a control means so that each part inserted in the support holding means can be maneuvered in the view area of the inspection means and rotated and viewed from every possible direction along its axis.

Referring now to the drawings wherein like reference characters designate corresponding parts throughout FIGURES 1 to 4, there is shown in FIGURE 1 a radiographic and microscopic inspection device located in a radiation room adjacent a control room.

The radiation room 10 is provided with an X-ray video-com camera means 12. A support means 13 comprising a table 14 with a slidable top 15 is positioned in cooperation with the video-com camera means 12. A first motor 16 is mounted on table 14 and engages with the table top 15 serrated edge 17 for activating movement of the slidable top 15. A support structure 20 is mounted on the slidable top 15 and supports the controlled specimen holding means 22.

The support means 14 in combination with the video-com camera means 12 and the controlled parts holding means 22 are enclosed in the radiation room 10 and electrically connected to a control panel means 24 and display TV means 26 in the operator control room 28.

In FIGURE 2, part of the support means 14 is illustrated. The slidable top 15 is provided with rollers 30 engaging the guidance means 32. The controlled specimen holding means 22 comprises; a second motor 34 driving a rotating ring 36 by chain and sprocket means 38. Mounting means 40 are provided in the rotating ring 36 for the installation of a removable ring 50.

The removable ring 50 is provided with a plurality of support holders 52 rotationally mounted on bearings 54. The support holders 52 can be rotated individually by means of a contacting belt 56 when installed on the rotating ring 38 by fastening means 40. The belt 56 is driven by a third motor assembly 58 which is mounted on the slidable top 15. Specimens 60 are shown inserted on the support holders 52. In FIGURE 3, there is illustrated a part of the rotating ring 36 installed with part of the removable ring 50. FIGURE 3 shows in particular the two controlled rotating mechanisms necessary to maneuver the specimen 60 360° for inspection purposes. The second geared motor 34 rotates the rotating ring 36 and removable ring 50 when energized via the control panel 24. The third motor assembly 58 rotates belt 56. The member 62 is provided with a Teflon portion 64, which holds the belt 56 against bearing 54. A belt tensioner 66 is mounted next to member 62.

In FIGURE 4, there is shown a detailed section of the movable ring connected to the rotation ring 36 and shows in particular the specimen holders 52 inserted for rotation on bearings 54 and provided with a specimen 60.

Having thus described the several components by reference numbers the operation of the device is as follows:

The removable ring 50 is placed on a flat surface with its support holders 52 in an upward position. A multiple amount of specimen or electrical components 60, to be tested, are inserted into the support holders 52. Each support holder 52 is identified by a number or mark so that each tested component can be oriented and identified later. The removable ring 50 is then installed on the rotating ring 36 and fastened by mounting means 40. The operator will leave the radiation room 10 and enter the control room 28. The display TV means 26 is switched on and the first motor is energized by a switch on the control panel means 24. The slidable top 15 will move to the required position so that the specimen 60 becomes visible on the display screen 26. In case that a specimen 60 is of an elongated shape, the operator will energize the first motor means and thus move the component along its longitudinal axis. Also, the operator can spot the identification number which is printed on the support holder 52. In order to obtain a 360° inspection of the individual specimen 60 displayed on the TV screen 26, the operator energizes, by a switch on the control panel means 24, the third motor 58, which then rotates specimen 60. As shown in FIGURE 3, the third motor 58 drives a belt 56 which has frictional contact with the bearing 54. A piece of Teflon 64 assists in the contacting friction of the belt and adjustable member 66 keeps the belt in tension.

In order to move from one specimen 60, which has been inspected, to the next, the operator energizes the second motor 34 thereby rotating the ring 36 and its thereon mounted ring 50 with support holders 52. The operator in the control room 28 is thus capable of viewing a specimen along its elongated axis and from each possible direction over 360°. Thus by simply switching on the control panel 24, all kinds of specimens, electrical components, such as resistors, transistors, condensers, etc. and electrical mechanical parts, such as switches, relay, etc. can be inspected by the X-ray video-com television system in a minimum amount of time. Each component passing the inspection can thus be relied upon.

A specimen having internal construction failures, weak areas, contamination, loose particles, etc. can be easily noted and rejected.

It has been proven that the use of this inspection device has a tremendous value for electro-miniature components.

Although various minor structural modifications might be suggested to the preferred embodiment herein described by way of illustrative example only it should be understood that many changes could be effected to the exemplary structure without departing from the spirit of the patent invention, and, accordingly, it should be further understood that the inventor wishes to enclose within the scope of the patent warranted hereon all such modifications as reasonably and properly come within the scope of the inventor's contribution to the art.

I claim:
1. A device for carrying a multitude of specimens for individual 360° inspection comprising in combination:
   (a) a support means,
   (b) carriage means movably mounted on said support means,
   (c) said carriage means comprising a driving ring and a removable ring,
   (d) drive means engaged with said driving ring of said carriage for activating movement of said carriage means,
   (e) specimen support holding means rotationally mounted on said removable ring of said carriage means,
   (f) said removable ring being removable from said driving ring for loading and unloading of specimens from said specimen support holding means,
   (g) associated X-ray inspection means arranged to X-ray a predetermined area adjacent said carrying means so that at least one of said support holding means carrying a specimen is being X-rayed, and
   (h) means for rotating said specimen carrying holding means in said area.

2. A device as claimed in claim 1 wherein said means for rotating said specimen carrying holding means comprises bearings on which said specimen carrying holding means are supported and a second drive means arranged in engagement with at least one of said bearings in said X-ray viewing area.

3. The device of claim 2 wherein said second drive means comprises a power actuated belt.

References Cited

UNITED STATES PATENTS

| | | | |
|---|---|---|---|
| 2,169,483 | 8/1938 | Adrian | 250—52 |
| 2,905,827 | 11/1957 | Graves | 250—65 |
| 2,907,883 | 10/1959 | Jacobs et al. | 250—52 |

RALPH G. NILSON, *Primary Examiner.*

S. C. SHEAR, *Assistant Examiner.*